United States Patent

Klassen

[11] Patent Number: 6,081,340
[45] Date of Patent: Jun. 27, 2000

[54] IMAGE PROCESSING METHOD TO REDUCE MARKING MATERIAL COVERAGE WITH NON-LINEAR SPECIFICATIONS

[75] Inventor: R. Victor Klassen, Webster, N.Y.

[73] Assignee: Xerox Corporation, Stamford, Conn.

[21] Appl. No.: 08/828,629

[22] Filed: Mar. 31, 1997

[51] Int. Cl.$^7$ .............................. B41B 15/00; G06F 15/00; H04N 1/46; G03F 3/08

[52] U.S. Cl. .......................... 358/1.1; 358/1.1; 358/1.18; 358/516; 358/517; 358/518; 346/51; 346/49

[58] Field of Search ................................. 395/109, 117, 395/101, 104, 103, 108; 358/526, 456, 466, 516, 517, 518, 500, 501; 346/51, 49; 355/83

[56] References Cited

U.S. PATENT DOCUMENTS

| | | | |
|---|---|---|---|
| 4,551,751 | 11/1985 | Jung | 358/75 |
| 4,595,948 | 6/1986 | Itoh et al. | 358/75 |
| 4,649,500 | 3/1987 | Yamada et al. | 364/518 |
| 4,736,315 | 4/1988 | Ozaki et al. | 364/582 |
| 4,763,190 | 8/1988 | Froelich | 358/79 |
| 4,930,018 | 5/1990 | Chan et al. | 358/298 |
| 4,965,593 | 10/1990 | Hickman | 346/140 R |
| 4,999,646 | 3/1991 | Trask | 346/11 |
| 5,016,191 | 5/1991 | Radochonski | 364/518 |
| 5,068,170 | 11/1991 | Abe | 430/393 |
| 5,068,649 | 11/1991 | Garrett | 340/793 |
| 5,084,762 | 1/1992 | Miyakawa | 358/79 |
| 5,111,302 | 5/1992 | Chan et al. | |
| 5,126,838 | 6/1992 | Ohsawa et al. | 358/75 |
| 5,130,823 | 7/1992 | Bowers | 358/465 |
| 5,170,711 | 12/1992 | Maier et al. | 101/365 |
| 5,233,366 | 8/1993 | Stephany | 346/1.1 |
| 5,237,344 | 8/1993 | Tasaki et al. | 346/140 |
| 5,278,671 | 1/1994 | Takahashi et al. | 358/456 |
| 5,335,315 | 8/1994 | Yoshida et al. | 395/109 |
| 5,353,387 | 10/1994 | Petschik et al. | 395/109 |
| 5,359,437 | 10/1994 | Hibi | 358/529 |
| 5,369,510 | 11/1994 | Taguchi | 358/529 |
| 5,402,245 | 3/1995 | Motta et al. | 358/298 |
| 5,425,134 | 6/1995 | Ishida | 395/109 |
| 5,515,479 | 5/1996 | Klassen | 395/109 |
| 5,519,815 | 5/1996 | Klassen | 395/109 |
| 5,563,985 | 10/1996 | Klassen et al. | 395/109 |

FOREIGN PATENT DOCUMENTS 0 580 376  1/1994  European Pat. Off. .

OTHER PUBLICATIONS

J.A.C. Yule, *Principles of Color Reproduction*, (John Wiley & Sons, Inc., New York, 1967), pp. 294–327.

Klassen, "Reducing Ink Coverage Levels in Binary CMYK Images", Proc. Soc. Imaging Science and Technology, 46th Annual Conference (May, 1993), pp. 173–175).

*Primary Examiner*—Edward L. Coles
*Assistant Examiner*—Twyler Lamb

[57] ABSTRACT

A printing system for printing images, and including a system to reduce marking material coverage, while maintaining color fidelity, includes an image input, where the image defines an amount of marking material to be deposited on an printed reproduction, a marking material coverage calculator, determining expected original marking material coverage for a given area of a received image; and a marking material reduction controller, using the expected marking material determination to control coverage reduced reproduction of the given area in accordance with a non-linear coverage reduction function.

2 Claims, 5 Drawing Sheets

IMAGE PROCESSING METHOD TO REDUCE MARKING MATERIAL COVERAGE WITH NON-LINEAR SPECIFICATIONS

This invention relates to an image processing method for reducing the amount of marking material required to print a colored image, to avoid problems common to the use of excessive amounts of ink or toner, and to provide the capability to do so in a non-linear manner.

BACKGROUND OF THE INVENTION

Full color printing has become a desired goal of office products. Two different types of full color printers which have significant potential for fulfilling such goals are the ink jet printer and the electrophotographic printer. Color printing is accomplished by providing multiple layers, or separations, of ink on a page. Commonly, colors are provided by subtractive combinations of cyan, magenta and yellow inks. To print black, a combination of equal amounts of cyan, magenta and yellow is printed, or a fourth black ink is used as a substitute. Undercolor removal, a well known process in the printing arts, can be used to print a single layer of black ink as a substitute for the combination of equal amounts of cyan, magenta and yellow. For a fuller discussion of under color removal and its application to electronically derived or created images, reference is made to J. A. C. Yule, *Principles of Color Reproduction*, (John Wiley & Sons, Inc., New York, 1967), pages 294–327.

A problem of color printers generally is that when too much marking material is used, undesirable image artifacts and printing defects occur. In liquid marking material printers such over coverage is characterized by the problems of ink puddling or pooling, bleeding to adjacent image areas, and flow through to the back side of the receiving material. Paper cockle is also a problem due to saturation of the paper receiving material and subsequent rapid drying. In powdered marking material printers, paper curl and cockle is caused by differential shrinkage of toner and paper in the printing process. In both liquid marking and powder marking printers, coverage reduction as in U.S. Pat. No. 5,515,479 to Klassen reduces marking material coverage in documents including heavily saturated regions of continuous tone images (see also, Klassen, "Reducing Ink Coverage Levels in Binary CMYK Images", Proc. Soc. Imaging Science and Technology, 46th Annual Conference (May, 1993), pp. 173–175). Also see, U.S. Pat. No. 5,519,815 to Klassen, U.S. Pat. No. 5,563,985, and U.S. patent applications Ser. Nos. 08/313,520 and 08/291,371, which name R. V. Klassen as one of the inventors, and are specifically incorporated by reference. To prevent artifacts from occurring in the pixel reduction step, a processing path through each given area is used which tends to "randomize" the turn OFF effect. For cost and implementation reasons, it is usually desirable for the process to operate irrespective of image content, or on the separation binary bitmaps without further image information, although it is possible to use the process on gray level or mulitbit images.

U.S. Pat. No. 5,237,344 to Tasaki et al describes a method for reducing the amount of ink printed to 50%, 75% or 66%. The method uses fixed patterns of turn-off locations (e.g., a checkerboard for 50%) and selects the pattern based on the printing mode (reverse character mode, block graphic mode or normal character mode), the character selected, and possibly the relative humidity. Apparently, the method is designed for single color (black) printing: if it were used for multiple separation (e.g., red formed from yellow and magenta) printing, both separations would be turned off in the same place, resulting in more obvious patterns. The small set of fixed turn-off patterns makes the method very sensitive to line angle, as lines at some angles will have more pixels turned off than others. Also the method is only useful for characters from a built-in font, including graphic characters: arbitrary fonts and shapes, such as are requested in documents created using industry standard page description languages e.g. PCL or PostScript, cannot be handled in this way.

U.S. Pat. No. 4,930,018 to Chan et al. teaches reduction of paper cockle and graininess of ink jet prints. Printing of a given scan line occurs multiple times, with three different dye loadings, with pixels requiring the highest dye loading printed on one pass, pixels requiring an intermediate dye loading printed on another pass, and pixels requiring the lowest dye loading on another pass. The method takes as input continuous tone RGB (red—green—blue) images and performs RGB-CMYK (cyan—magenta—yellow key or black) conversion with full under color removal. As understood, printing is performed at half resolution, so that "pixels" in the input image correspond to 2×2 blocks in the output image. The image data is first error diffused from 8 bits per pixel per separation to 4 bits pixel per separation. Then, for each pixel, a count of up to 4 drops of each dye loading is computed, for each separation. There are multiple choices, ranked in order of total ink coverage. If the highest coverage choice exceeds the maximum allowable coverage, the separation with highest coverage is changed to use a lower coverage value for the same gray level, if possible. If it is not possible to stay at the same gray level, the gray level for that separation is dropped by one, and the error passed on to neighbors. The process iterates until the total ink coverage is as low as required. Pixels within the 2×2 block are assigned values (0 or 1) by proceeding around the block in clockwise order, and filling in pixels in order. First, the high dye load pixels are turned on, then the medium, then the low. Within each dye loading group, first black is turned on, until there are no more black pixels of that dye loading, then the next pixels in the cycle are cyan, until there are no more cyan required, then magenta, and yellow, and then the next dye load group. By maximizing ink coverage and using multiple dye loadings, they reduce the noisiness of the image, and by maintaining the total ink coverage within known limits, they prevent the many problems associated with excessive ink.

U.S. Pat. No. 4,999,646 to Trask teaches limiting coverage to 100% coverage (by the above definition of coverage), or perhaps between 100 and 200% coverage (if 100% corresponds exactly to no white spaces on a page), owing to the circular shape and overlap of print dots. Coverage is limited by using 2×2 super pixels and assigning each one drop per pixel in a combination that depends on the color required. Assuming one bit per separation input with full undercolor removal, there are eight possible colors that could be requested (including white). In order to reduce patterning due to the multiple swaths, two passes are used, each of a checkerboard pattern of pixels (the two passes being offset to provide full coverage). The two pass process allows ink to dry between passes.

Known prior art methods provide coverage reduction using a procedure in which for each pixel set in the image, the desired amount of coverage is added to a cumulative error term, and if the error term exceeds the measured amount, the pixel is left set ON, and otherwise it is turned OFF. When the pixel is left set, the accumulated error has the measured amount subtracted from it. This arrangement provides a very linear transform, with a sharp discontinuity at the point where turn OFF occurs. This discontinuity has made color correction calibration in systems using marking material coverage reduction very difficult. It would be desirable to a) not make changes to the image at low, non-problematic densities, and b) control the turn off function more in line with the materials requirements, or non-linearly.

Other patents of interest include: U.S. Pat. No. 5,016,191 to Radochonski; U.S. Pat. No. 5,233,366 to Stephany; U.S. Pat. No. 5,084,762 to Miyakawa; U.S. Pat. No. 4,965,593 to Hickman; U.S. Pat. No. 5,111,302 to Chan et al.; U.S. Pat. No. 4,596,948 to Itoh; U.S. Pat. No. 4,736,315 to Ozaki et al.; U.S. Pat. No. 5,068,649 to Garret; U.S. Pat. No. 5,130,823 to Bowers et al.; U.S. Pat. No. 5,170,711 to Maier et al.; U.S. Pat. No. 5,278,671 to Takahashi; U.S. Pat. No. 4,551,751 to Jung; U.S. Pat. No. 4,763,190 to Froelich; U.S. Pat. No. 5,068,170 to Abe; U.S. Pat. No. 5,126,838, Oshawa et al.; U.S. Pat. No. 5,353,387 to Petschik et al.; U.S. Pat. No. 5,359,437 to Hibi; U.S. Pat. No. 5,369,510 to Taguchi; U.S. Pat. No. 5,402,245 to Motta et al.; U.S. Pat. No. 5,425,134 to Ishida; U.S. Pat. No. 4,649,500 to Yamada; U.S. Pat. No. 5,335,315 to Yoshida et al.

The above-identified references are incorporated by reference for their teachings.

SUMMARY OF THE INVENTION

In accordance with the invention, there is provided a method for reducing the amount of marking material used in a printer for full color images while minimally affecting the appearance of the color image.

In accordance with one aspect of the invention, there is provided a printing system for printing images from bitmaps, and including a system to reduce marking material coverage, while maintaining color fidelity, including: an image input, the image defining an amount of marking material to be deposited on a printed reproduction thereof, a marking material coverage calculator, determining expected original marking material coverage for a given area of a received image; a coverage reduction function generation system, controlled by the marking material coverage measurement, to determine a coverage reduction function for a given expected marking material coverage; and a marking material reduction controller, using the function to control the marking material reduction.

In accordance with another aspect of the invention, there is provided a printing system for printing images, including a system to reduce marking material coverage, while maintaining color fidelity, including: an image input, the image defining an amount of marking material to be deposited on a substrate to make a printed reproduction thereof, a marking material coverage calculator, determining expected original marking material coverage for a given area of a received image; and a marking material reduction controller, using the expected marking material determination to control coverage reduced reproduction of the given area in accordance with a non-linear coverage reduction function.

In accordance with one aspect of the invention, marking material coverage is left unaffected at low input densities, variably altered at middle input densities, and set to a maximum amount of coverage at high input densities. The variable alteration can be preloaded for a system in a programmable lookup table.

These and other aspects of the invention will become apparent from the following descriptions to illustrate a preferred embodiment of the invention read in conjunction with the accompanying drawings in which:

Figure 1:
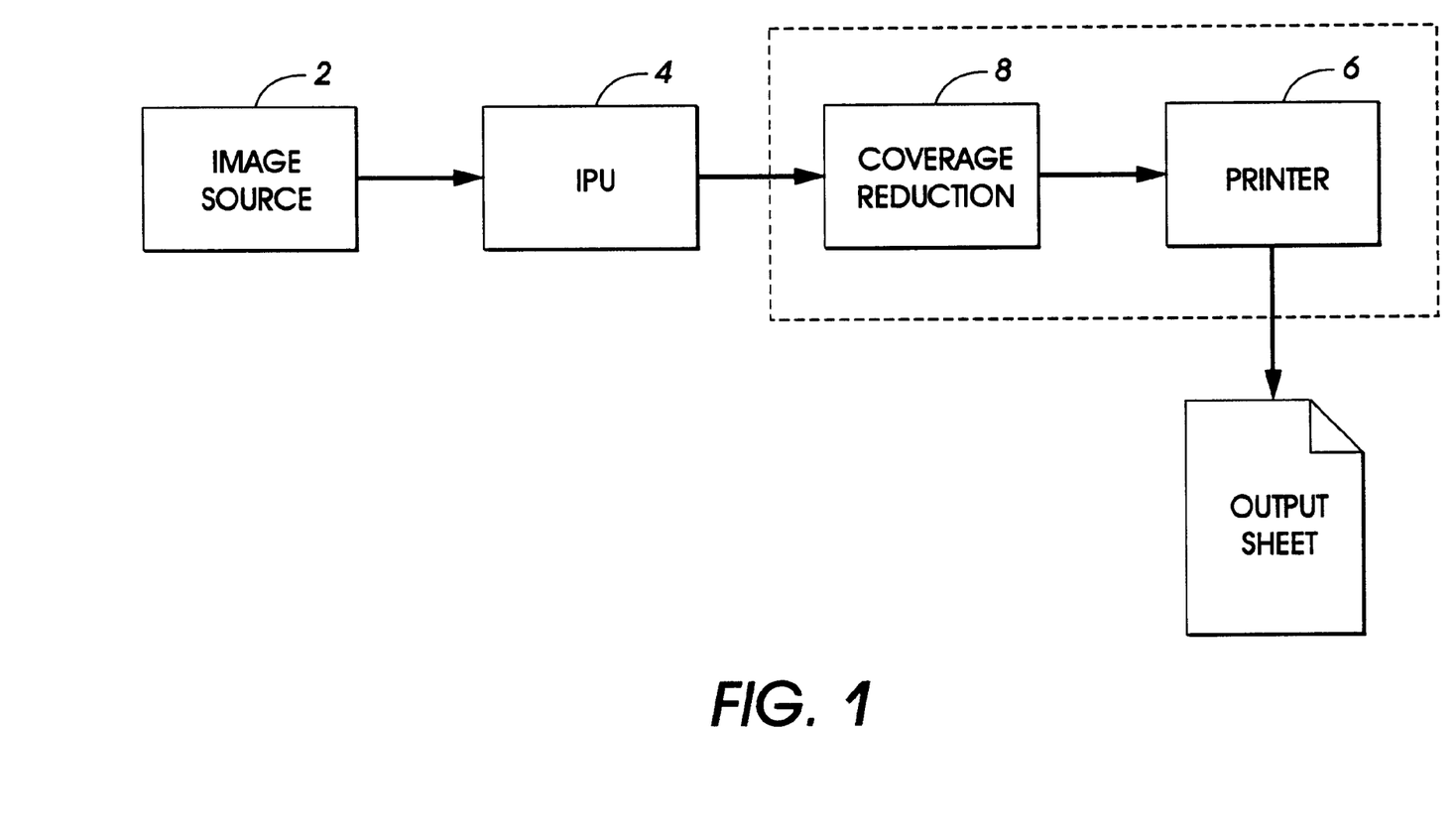
FIG. 1 is a block diagram of a system in which the present invention may find use.

Referring now to the drawings where the showings are for the purpose of describing the preferred embodiment of the invention and not for limiting same, a basic functional block diagram for a system for carrying out the present invention is shown in FIG. 1. Generally speaking the present invention may find use in a printing system, where images are created at an image source 2, such as a computer, scanner, memory or the like. The images are generally prepared for printing at an image processing unit or IPU 4. Print ready images are presented to a printer 6, which prints the images on sheets in accordance with its marking technology. Marking material coverage reduction 8 can be provided at the input to printer 6.

Figure 2:
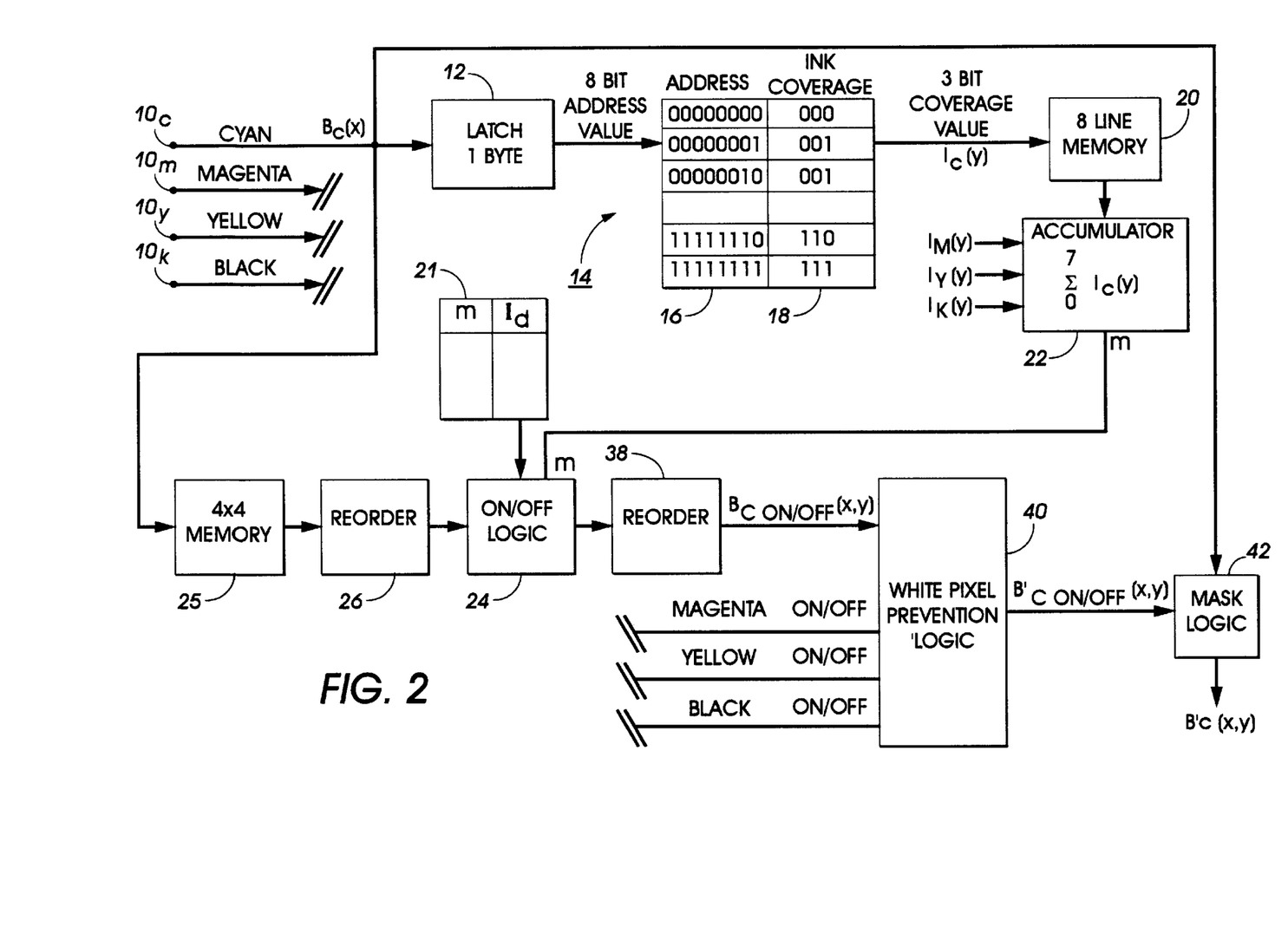
FIG. 2 is a functional block diagram of a system for carrying out the present invention.

With reference now to FIG. 2, a plurality of video inputs $10_c$, $10_y$, $10_m$, and $10_k$, each representing one of the cyan, magenta yellow or black separations $B_N(x,y)$ of image $B(x,y)$ is directed into the marking material coverage reduction system. Since the process of the system is mostly redundant for each separation, initially only the cyan bitmap $B_C(x,y)$ will be described. Bitmap $B_C(x,y)$ is a binary bitmap in this system, defined along fast (x-axis) and slow scan (y-axis) axes, describing the image in terms of 1 bit pixels arrayed in scan lines. Each pixel is an image signal, which may be said to have a condition or image state, which describes for a binary pixel whether a print dot will be made at the output or not. This may also be equated to whether the pixel is ON or OFF, 1 or 0. Thus, there are two image states for any pixel in a binary printer. For a multilevel printer, there may be more than two pixel values, and a similarly larger number of pixel image states.

To determine ink coverage over a given area, bitmap $B_C(x,y)$ is directed initially to a one byte (8 bit) latch 12, which stores eight one bit pixel values in order 1 to 8. This 8 bit stored binary string, which represents the bitmap image in an 8 pixel×1 scan line portion of the given area, is used as an address to access a 256 entry look up table (LUT) 14. The data stored at each of addresses 16 in the look up table represents ink coverage values 18, for the 8 pixel area stored at latch 12. It will no doubt be appreciated that many of these ink coverage values are the same, as shown by the demonstration of address 00000001 and address 00000010, which each have ink coverage values of 1. Should ink coverage be non-linear in character, because, for example, the ink jet device tends to deposit more or less ink when operated in certain image formations, then such non-linearity may be accounted for in loading the LUT 14 values.

Ink coverage values 18, which in the example can be represented by 3 bit binary values, now form a signal or function $I_C(x,y)$, representing predicted ink coverage in an 8 pixel×1 scan line area. A group of these values, stored in 8 row memory 20, are summed together at accumulator 22 to derive total ink coverage over a given area, in this case, 8 pixels×8 scan lines in size. The output of accumulator 22 is a value m, the predicted or measured ink coverage value for each separation of the given area of the image if no changes are made to the image. The values of $I_N(y)$, measured for each of the cyan, magenta, yellow and black separation bitmaps, are added to derive a value m, which is the predicted or measured ink coverage value for the given area of the image. It is possible that some colors bleed more than others; if so, some separations might be weighted more heavily in the summation.

An 8 pixel by 8 scan line block for the given area has been selected for processing convenience, and because it reflects a useful size for the ink reduction determination. If the area is too large, the ink coverage variations will be averaged in the reduction determination, giving low ink coverage indications when portions within the large area exceed the maximum desirable ink coverage. The choice of area or window size is a compromise between the precision with which coverage can be measured (the larger the area the more possible ink coverage levels) and the (local) accuracy of its measurement. One way of increasing the precision without reducing the locality is to use a weighted sum (more heavily weighting the center) to find the coverage near the center of the window. This would work best for finding the coverage in the neighborhood of a single pixel. In this embodiment, coverage was determined using an unweighted average over the 8×8 area, as, if this area should prove satisfactory, it would be much less expensive to compute. Finally, there is very little difference between using an 8×8 window and, for example a 6×6 window. Of course, many possible areas of different sizes can be used. The 8×8 window allows for greater efficiency of implementation as it uses complete bytes. Computing coverage in an 8×8 window, always aligned on a 4 bit boundary can be done efficiently using small tables. When the window is byte-aligned, a 256 entry table may be indexed by the contents of the scanline covered by the window, for each scanline in the window, summing the results; when it is not byte-aligned, two 16-element tables for may be indexed for each scanline, to compute:

cl[p1 & 0xf]+cr[p2>>4], where p1 and p2 are the values in the image beneath the window;

cl and cr are appropriately initialized tables having 16 entries giving bit counts.

This expression refers to the use of the low order four bits of p1 to index into table cl, and the high order bits of p2 to index into table cr.

Thus far, an arrangement for measuring actual or predicted ink coverage is shown. Other ways of determining actual or predicted ink coverage exist, and the invention is not limited to the described arrangement.

Value m is used at ON/OFF logic 24 to control the turn OFF of pixel in each separation of the image. In accordance with the invention, depending on the density of the area of image, as determined by the measurement m, a different turn OFF determination will be used, to better control the printer response. In the described embodiment, the entire range of densities are divided into three subranges. However, it will be appreciated that the entire range can be divided into any number of ranges greater than 1.

Looking initially at each turn OFF arrangement, for relatively low density levels, and areas where such low density levels occur, if the density is below the problematic densities for the marking material/paper coverage, there is no need to change the image in any way. In these arrangements, it is an important consideration, that areas of the image that require no change, not be changed, if possible. For these density levels, given for density levels $0 \leq I_{input} \leq p_0$, where p is a density range between 0 and a system maximum, $P_{max}$, and $p_0$ is the density in p selected such that no changes to the image should be required below $p_0$, then, $I_{desired} = I_{input}$ The range of midlevel densities is given by $p_0 \leq I_{input} \leq p_1$, where $p_1$ is the level above which changes will definitely be required. In this range, wherein changes to the image using coverage reduction might occur depending on the maximum marking material coverage desired, a more complex relationship might be used. Given a maximum allowable coverage, $I_{max}$, the desired coverage should gradually approach Imax as the input coverage increases. Defining $t = (I_{input} - p_0)/(p_1 - p_0)$, $I_{desired} = (p_0 + (2t + t^2)(p_0 - I_{max})$ This scheme provides a quadratic blended response in the intermediate density region, which gradually increases the difference between the input (requested) amount of coverage and the output (desired) amount of coverage. The decreasing response can be non-linear. Other relationships which gradually change the amount of marking material used in response to the input image can, of course, be used. The advantages of this one are smoothness and continuity at both ends of the intermediate range.

Finally, at high densities, given by $p_1 \leq I_{input}$, the output value for the image will be the maximum desired output value for the system. Alternatively, the output value for the image could be related to the maximum desired output value.

Figure 3:
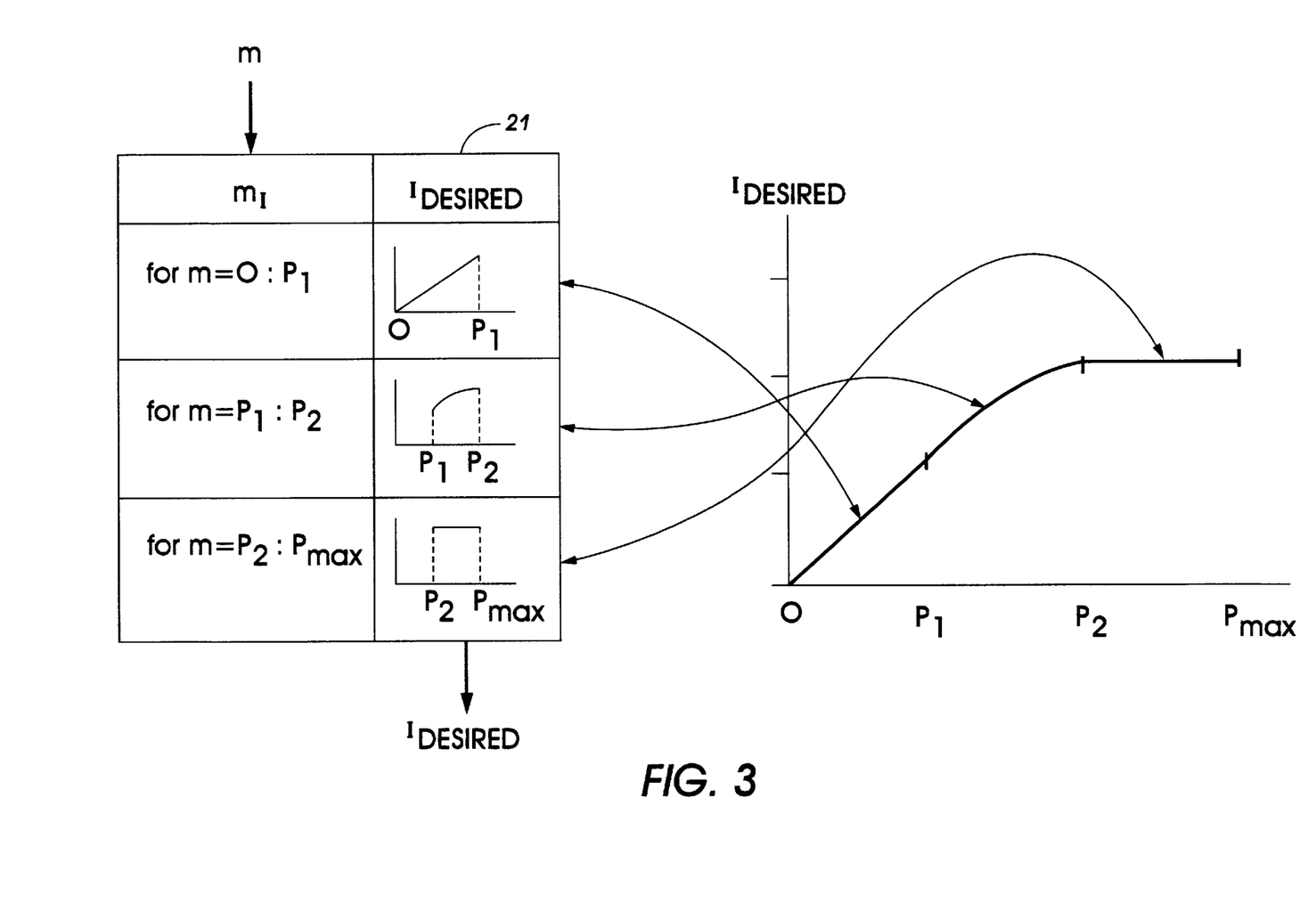
FIG. 3 shows the implementation of non-linear functions in the present invention.

The above scheme can be implemented in the form of a lookup table. For each possible image density, a system output can be defined and loaded into the lookup table. Thus, as shown in FIG. 3, a look up table is stored in a memory of a computer or the like, and indexed by m the actual or predicted coverage. Depending on the value of m, a distinct output response (or coverage reduction function) is output. While the arrangement is shown graphically, actual output values would be stored. While the arrangement is shown dividing m into three ranges, any number of ranges greater than or equal to 2 may be used, including providing a different coverage reduction value for every possible value m. Of course, a more limited number simplifies processing.

As applied to cyan bitmap $B_C(x,y)$, the function $I_{desired}$ would result in a periodic pattern, which, when imposed on a halftone pattern probably existing in $B_C(x,y)$, would result in undesirable moiré patterns in the reproduction of the image. Accordingly, one method of alleviating this problem is to randomize the application of the turn OFF function to the bitmap. However, it is also desirable that the determination of ON/OFF be made with knowledge of the determination for adjacent pixels, so that the application of the turn OFF ratio can be applied uniformly through the given area. Accordingly, the methods of U.S. Pat. Nos. 5,515,479 or 5,563,985, herein specifically incorporated by reference, the "walk" through the pixel locations may be processed in a manner that will give a randomized appearance. Other methods of producing a non-moire patterned result are possible.

With reference again to FIG. 2, it will no doubt be appreciated that other processing orders are possible, which process pixels in an order that is relatively random with respect to common halftone patterns, and retains dependence on adjacent pixels. Ordering of pixels is accomplished by storing a 4×4 set of pixels for which m has been determined in memory 25, and subsequently reading the values of $B_C(x,y)$ out of memory with processing order control 26, which reorders pixels of $B_C(x,y)$ in accordance with the selected pixel ordering function.

Once the turn OFF function for an 8×8 set of pixels is determined, that ratio is applied to a 4×4 pixel grouping therewithin, processed in accordance with the process ordering specified. The use of an 8×8 area for determining the turn OFF ratio smoothes abrupt changes which might occur if a smaller area is used for that determination.

At ON/OFF logic 24, a logical process is employed implementing the determined turn OFF ratio. The fraction of pixels to be left ON is the ratio of the desired coverage to the measured coverage. This can be exactly retained as a rational number, $I_{desired}/m$. A simple logic process ensuring that d of every m pixels are turned on is:

$f=0$ for each pixel $f=f+d/m$ if $(f \leq m)$ turn on this pixel $f=f-1$

Next pixel

Where f, initially set to zero, is the (fractional) number of pixels that should have been turned on since the last one was turned on, or alternatively the fraction of the way to the next pixel that should be turned on.

Pixels are spaced as uniformly as possible along the path that gives the order in which they are visited. If the control variable f is initialized only at the start of the page, and not in each window, the average over a larger region will be correct. By scaling f by m, the use of non-integer values is eliminated:

$f=0$ for each pixel $f=f+d$ if$(f \geq m)$ turn on this pixel $f=f-1$

Next pixel

The initial setting of f to zero is arbitrary, as over an entire image the initial value of f is of no consequence. To reduce inter-separation correlations it may be advantageous to use various values between 0 and m for the initial settings of the control variable for different separations. The comparison with m is also arbitrary and for the same reason. If the comparison is with 0 it may be more efficient and can be accomplished without changing the result in any way by subtracting m from the initial value of f:

$f=-m$ for each pixel $f=f+d$ if $(f \geq 0)$ turn on this pixel $f=f-1$

Next pixel

It will be noted that this logic is similar to Bresenham's algorithm for drawing lines, which for computer graphics determines the distance along a first axis, before a step must be made in the second axis for a line extending in two axes.

At block 38, the function is reordered into the original image order as $B_{CON/OFF}(x,y)$, which is a mask representing the turn OFF function. At block 40, white pixel prevention logic is provided, to prevent the occurrence of a corresponding pixel in every separation from being turned OFF, which might allow white or background show through. Assuming 100% coverage is acceptable, totally white pixels should not be introduced into the image. Thus, if a full color pixel has 200% coverage, and a pixel in one separation is turned OFF, the corresponding pixels in other separations should not all be turned OFF when that pixel is visited for the other separation:

$f_c=0$ $f_m={}^m/_4$ $f_y={}^m/_2$ $f_k={}^{3m}/_4$ calculate the pixelwise coverage for each pixel/separation pair, in some order if this pixel is ON in this separation $f_{sep}=f_{sep}+d$ if$(f_{sep} \geq m)$ or the coverage in this pixel is 1, turn ON this pixel $f_{sep}=f_{sep}-m$ else turn OFF this pixel decrement the coverage in this pixel by 1.

Accordingly, a set of ON/OFF conditions is created for a 4×4 area of the image, reducing the number of ON pixels in that area in accordance with the determining turn OFF ratio, $B'_{CON/OFF}(x,y)$. This set of values is then used as on input to a masking logic 42, which uses $B'_{CON/OFF}(x,y)$ in altering the bitmap BC(x,y) at block 42 from which the now adjusted image $B'_C(x,y)$ is directed to the printer controller.

Figure 4:
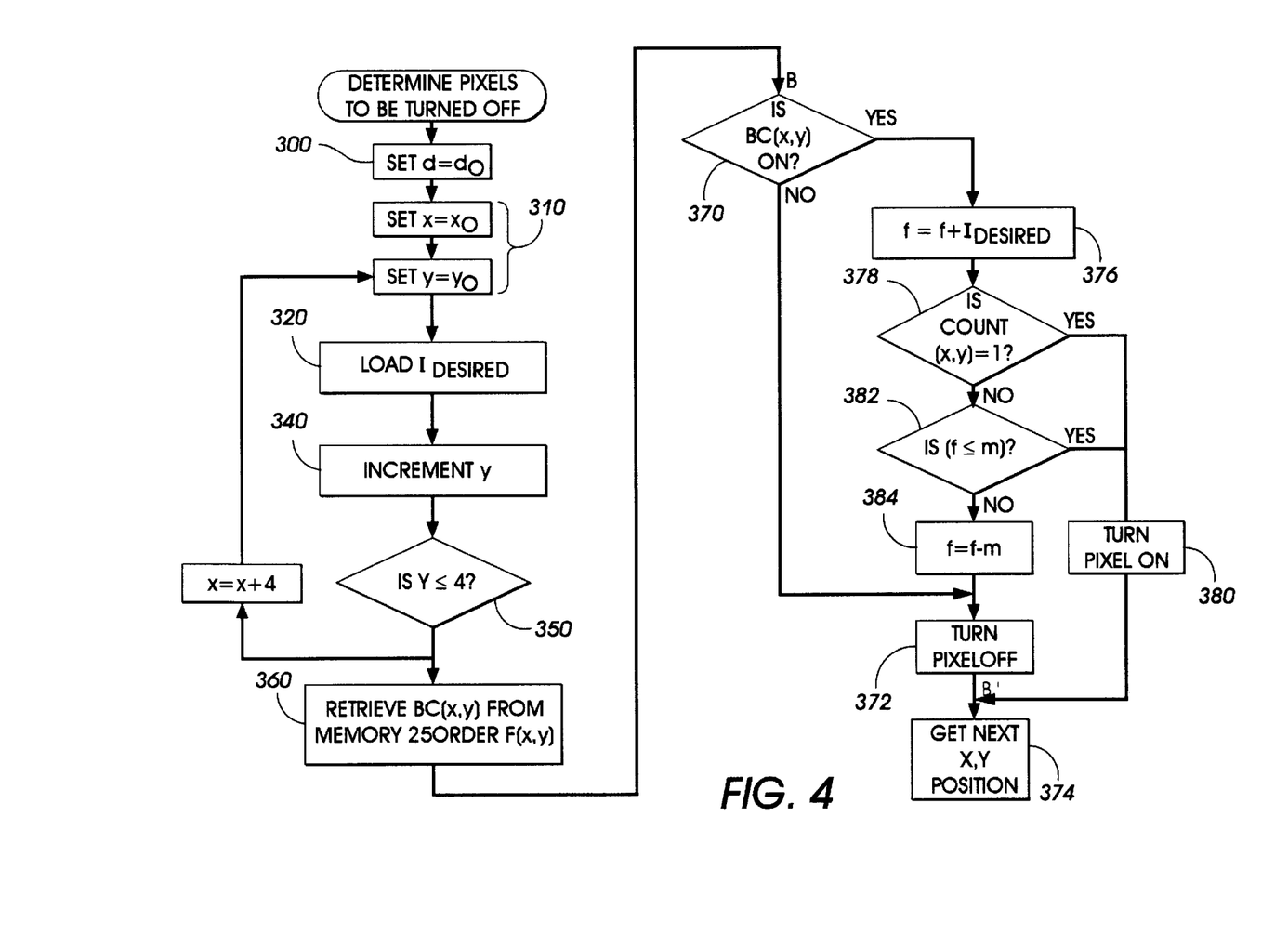
FIG. 4 illustrates the ON/OFF logic used for coverage reduction.
Figure 5:
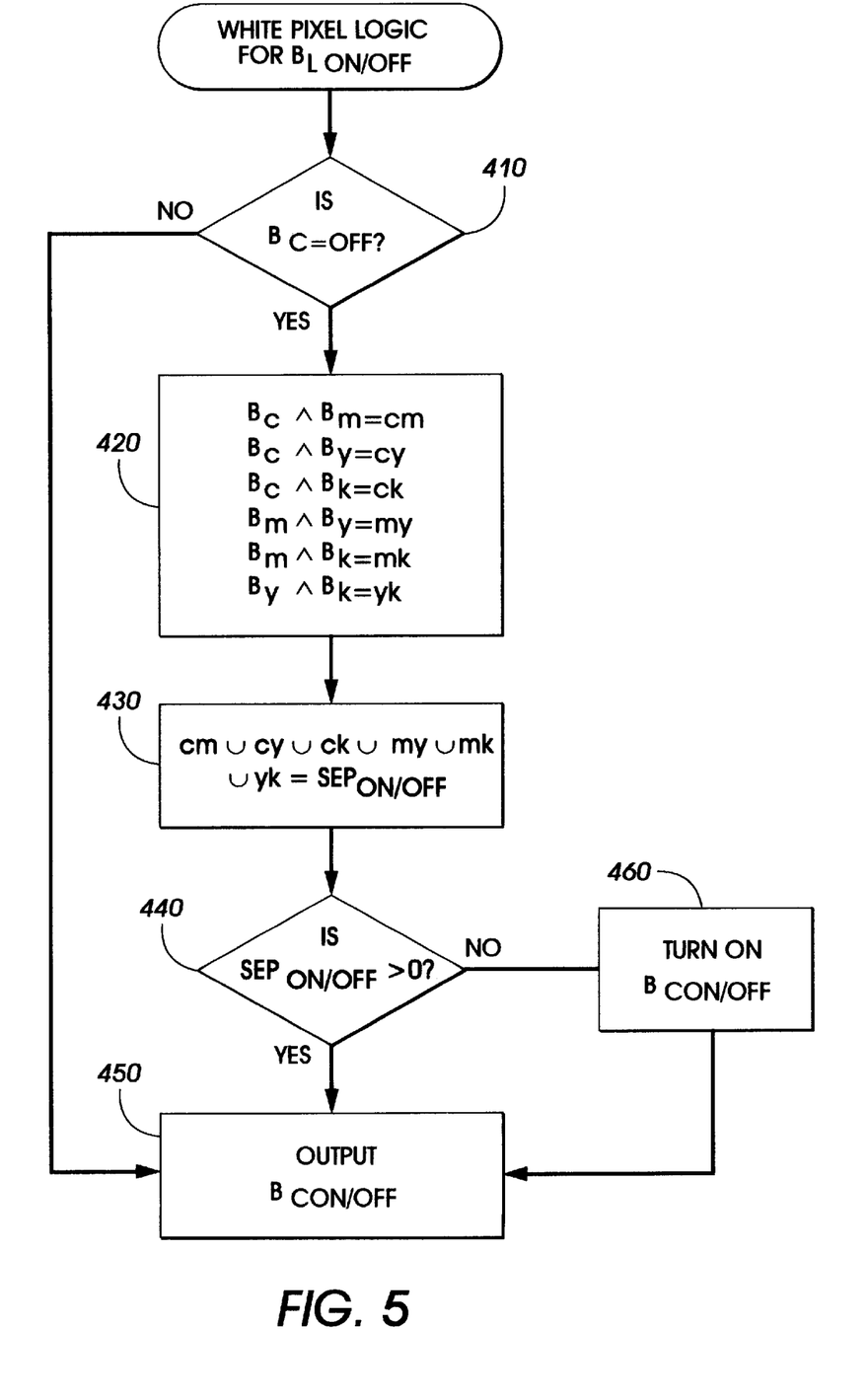
FIG. 5 shows white pixel prevention logic.

With m for each pixel determined at FIG. 5, where a flow chart is shown for a single pass across an image, ignoring image edges, the substeps of the pixel ON/OFF determination are shown, including 300) setting $I_{desired}$, probably entered into the process from LUT 200; 310) initializing scan line and pixel values to starting values (here, 0); 320) m is determined for a particular 4×4 with the 8×8 area for which m was determined, using the ink coverage measurement m determined by the method described with respect to FIG. 4. Steps 340 and 350 together store the pixel values of $B_C(x,y)$ in a memory 25. At step 360 pixels are read out of memory 25 by reorder processor 26 in order $F_C(x,y)$, to avoid moiré. $F_C(x,y)$ may vary from separation to separation, if required to avoid moiré. In FIG. 5, white pixel prevention logic is combined with the ON/OFF logic. At step 370, bitmap $B_C(x,y)$ is examined to determine whether the current pixel is ON or OFF. If it is off, the pixel remains off (step 372), and the next pixel is processed (step 374). If bitmap $B_C(x,y)$ is examined at step 370 and the current pixel is ON, at step 376, f is incremented by the value d. At step 378, the "count" is compared to 1. The count represents a running sum of other separations that are turned ON at the current x,y position. If the count equals 1, then only the current separation is turned ON, and accordingly, to avoid a white space, the current pixel should be turned ON at step 380. If the count is greater than 1, then there will be no white space occurring anyway. At step 382, f is compared to m. If f is less than or equal to m, then the pixels remains ON, at step 380. If f is not less than or equal to m, then f is decremented by m at step 384, and the pixel is turned OFF at step 372. Alternatively, if white pixel prevention logic is not combined with the ON/OFF logic, and with reference to FIG. 6, wherein a flow chart illustrates that $B_{CON/OFF}(x,y)$ white pixel prevention, if $B_{CON/OFF}(x,y)$ is OFF (step 410), then each separation turn off function $B_{NON/OFF}(X,Y)$ (represented for the purpose of this figure as $B_c$, $B_m$, $B_y$, $B_k$) is ANDed with the others (step 420) to derive $c_m$, $C_y$, $C_k$, $m_y$, $m_k$, $y_k$, which are then ORed together to derive a determination $SEP_{ON/OFF}$. If $SEP_{ON/OFF}$ is greater than 0 (Step 440), then at least one of the separations is to be turned ON, and no action is required. $B_{CON/OFF}(X,Y)$ is directed to an output at step 450. However, if $SEP_{ON/OFF}$ is equal to 0 (Step 440), then $B_{CON/OFF}$ (x,y) is turned ON. This is a rather simplistic solution, since undoubtedly, the choice of separation which is turned ON in white pixel prevention should be alternated among the separations that were turned OFF. Otherwise, if, for example, the cyan separation is always processed first, then the image make be skewed with a greater amount of cyan than desired.

While the present invention is demonstrated with the above embodiment, there is no doubt many others accomplish the invention. The important aspects of the invention are that non linear relationships of input signals to coverage reduced output signals may be stored. The present description assumes a binary or bilevel ink jet printer, but there is no reason in principle that the invention would not apply to a gray or other multilevel printer, where ink coverage is a function not only of the presence of a print dot, but also the gray level value of the print dot. Other printing processes which are printed on a pixel by pixel basis also have problems with excessive marking material, and may benefit from the described method or reduced marking material use. Notably, electrophotographic and ionographic printing methods using a pixel by pixel printing process for forming a latent image for development with dry or liquid toner marking materials, can suffer from excessive marking material, evidenced by sheet cockling and curling caused by differential shrinkage of toner and paper in the printing process.

The invention has been described with reference to a particular embodiment. Modifications and alterations will occur to others upon reading and understanding this specification. It is intended that all such modifications and alterations are included insofar as they come within the scope of the appended claims or equivalents thereof.

What is claimed is:

1. A printing system for printing images, and including a system to reduce marking material coverage, while maintaining color fidelity, including:

an image input, receiving a color image as a set of binary separation bitmaps, said color image defining an amount of marking material to be deposited on a substrate to make a printed reproduction thereof, a marking material coverage calculator, determining expected original marking material coverage for a given area of a received color image;

a marking material reduction controller, using the expected marking material determination to control a number of "ON" or "OFF" pixels of the given area in accordance with at least three coverage reduction functions, said functions selected for use based on expected marking material coverage, whereby improved color fidelity is obtained, said at least three coverage reduction functions including:

a first coverage reduction function, for a range of low marking material coverages, wherein coverage reduction is not applied;

a second coverage reduction function, for a range of relatively high marking material coverage, wherein a fixed output image response is obtained, irrespective of marking material coverage within said high marking material coverage range; and a third coverage, non-linear coverage reduction function, for a range of mid level marking material coverage, greater and less than maximum allowable marking material coverage, said function non-linearly increasing a difference between expected marking material coverage, and actually output material coverage.

2. The printing system as defined in claim 1, wherein said marking material reduction controller is a look up table, mapping measured marking material coverage to a plurality of coverage reduction functions, varying from no change to the image to a maximum coverage level.

* * * * *